J. B. STUART.
Carriage-Spring.
No. 63,330.
Patented Mar. 26, 1867
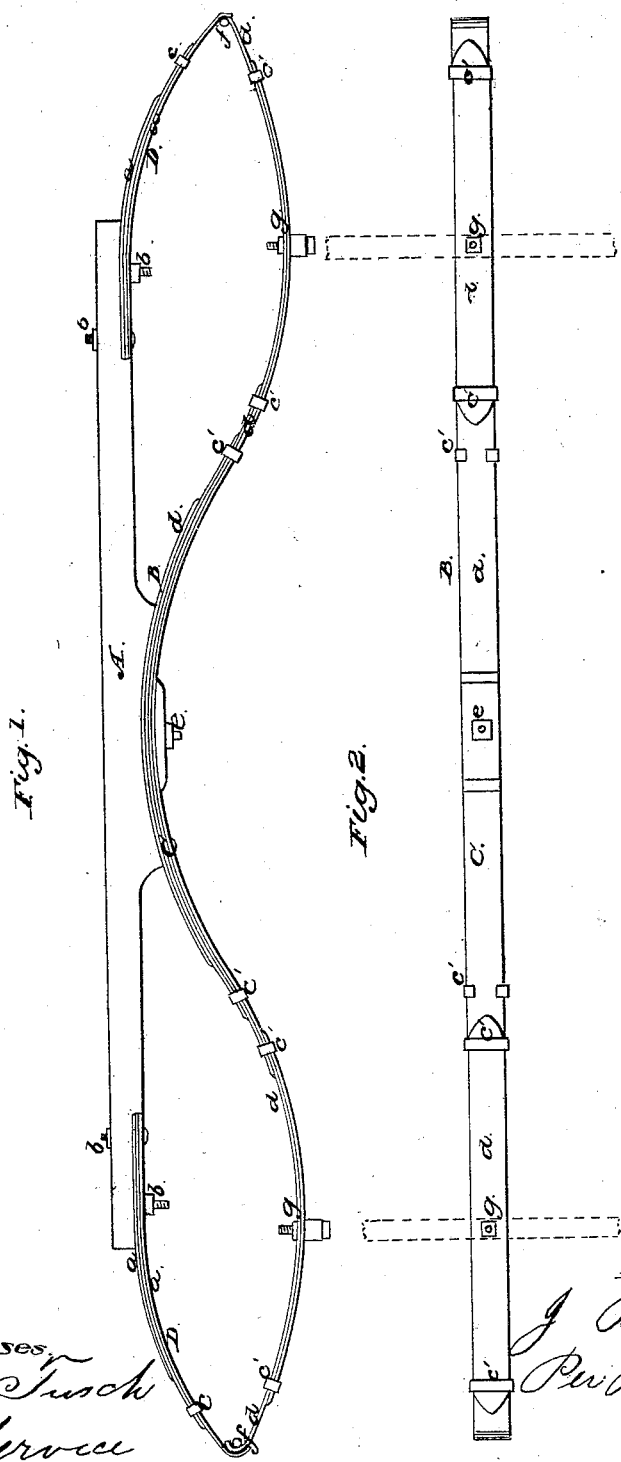

United States Patent Office.

JAMES B. STUART, OF BUNKER HILL, ILLINOIS.

*Letters Patent No. 63,330, dated March 26, 1867.*

---

IMPROVEMENT IN SPRINGS FOR VEHICLES.

---

*The Schedule referred to in these Letters Patent and making part of the same.*

---

TO ALL WHOM IT MAY CONCERN:

Be it known that I, JAMES B. STUART, of Bunker Hill, in the county of Macoupin, and State of Illinois, have invented a new and useful Improvement in Springs for Vehicles; and I do hereby declare that the following is a full, clear, and exact description thereof, which will enable others skilled in the art to make and use the same, reference being had to the accompanying drawings, forming part of this specification, in which—

Figure 1 is a side view of my invention.

Figure 2, an inverted plan of the same.

Similar letters of reference indicate like parts.

This invention relates to a new and useful improvement in springs for carriages and other wheel vehicles, and of the class commonly termed side springs.

The object of the invention is to obtain a spring of the class specified which will be strong and durable, possess a requisite degree of elasticity, and still hold the body of the vehicle firmly, so as to prevent all side surging and a backward and forward play or movement, and render unnecessary the use of a perch or reach with its accompanying braces.

A represents a spring bar, to which one side of the body of the vehicle is secured by bolts or any suitable fastening; B is a spring composed of three parts, C D D. The parts D D are short, and are composed of a series of leaves, $a$, placed one over the other, each constituting one-half of the upper part of an ordinary elliptic spring. These parts D D, at their inner ends, are firmly bolted to the ends of the bar A, as shown at $b$, the bar A being rigid and of wood or metal; the former material will probably be used. The leaves $a$ of the parts D D of the spring are of steel of different lengths, and said leaves are kept properly in contact by clips or collars, $c$, which are superior to the ordinary nipples and slots now used for that purpose, as the clips or collars $c$ encircle or encompass the leaves and hold the latter in contact under an upper as well as under a downward movement of the leaves. The part C of the spring is quite long, and is composed of a series of steel leaves, $d$, placed one over the other, of different lengths, and kept in contact by clips or collars, $c'$, like the leaves of the parts D D. The centre of the part C is secured to the centre of the spring-bar A by a bolt, $e$, and the ends of the part C are secured to the outer ends of the parts D D by joints, $f$. The part C of the spring, it will be seen, by referring to fig. 1, is of serpentine form, and the spring, as a whole, is very elastic. These springs are secured, one to each side of the body of a vehicle, and the part C of each spring, near its rear end, is secured to the rear axle by a suitable clip or bolt, $g$, the front part of each spring being secured to the bolster of the front axle by similar clips or bolts, $g$. These springs, thus constructed and applied, render the use of a perch or reach unnecessary; the body of the vehicle is also prevented from swaying laterally or working longitudinally, and the springs, at the same time, are sufficiently elastic to cause the body to yield or give and ride easily.

I do not claim broadly the application of side springs to a vehicle, for they have been previously used; but I do claim as new, and desire to secure by Letters Patent—

The constructing of a side spring for wheel vehicles of three parts, D D C, connected together and applied to a spring-bar A, substantially in the manner as shown and described.

I further claim the securing or holding of the leaves of the parts D D C in contact by means of clips or collars $c\ c'$, substantially as set forth.

JAMES B. STUART.

Witnesses:
SAMUEL BOOTH,
W. F. JOHNSON.